(12) United States Patent
Pouliquen et al.

(10) Patent No.: US 10,559,064 B2
(45) Date of Patent: Feb. 11, 2020

(54) STORAGE MEDIUM, INFORMATION-PROCESSING DEVICE, INFORMATION-PROCESSING SYSTEM, AND INFORMATION-PROCESSING METHOD

(71) Applicant: NINTENDO CO., LTD., Kyoto (JP)

(72) Inventors: Gilles Pouliquen, Paris (FR); Janos Boudet, Paris (FR); François-Xavier Pasquier, Paris (FR); Shinji Takenaka, Kyoto (JP); Kenji Iwata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 24 days.

(21) Appl. No.: 16/034,519

(22) Filed: Jul. 13, 2018

(65) Prior Publication Data

US 2019/0392558 A1 Dec. 26, 2019

(30) Foreign Application Priority Data

Jun. 22, 2018 (JP) .................................. 2018-118670

(51) Int. Cl.
```
G06T 3/60      (2006.01)
G01P 15/18     (2013.01)
A63F 13/212    (2014.01)
A63F 13/235    (2014.01)
A63F 13/211    (2014.01)
G06F 3/01      (2006.01)
```

(52) U.S. Cl.
CPC .............. G06T 3/60 (2013.01); G01P 15/18 (2013.01); G06F 3/012 (2013.01); A63F 13/211 (2014.09); A63F 13/212 (2014.09); A63F 13/235 (2014.09); A63F 2300/105 (2013.01); A63F 2300/8082 (2013.01)

(58) Field of Classification Search
CPC .................................. G06T 3/60; G01P 15/18
See application file for complete search history.

(56) References Cited

U.S. PATENT DOCUMENTS

```
8,743,219  B1 *  6/2014  Bledsoe .................. G06T 5/006
                                                       348/208.4
9,068,843  B1    6/2015  Sohn et al.
2009/0326847 A1 12/2009  Ohta
```
(Continued)

FOREIGN PATENT DOCUMENTS

```
EP   2 140 916 A2   1/2010
EP   3 054 266 A1   8/2016
JP   2010-5331      1/2010
```

OTHER PUBLICATIONS

Extended European Search Report dated Feb. 26, 2019 issued in European Application No. 18184000.0 (7 pgs.).

*Primary Examiner* — Jitesh Patel
(74) *Attorney, Agent, or Firm* — Nixon & Vanderhye P.C.

(57) ABSTRACT

An HMD includes an attitude calculating unit, an attitude correcting unit, an image generating unit, and a display control unit. The attitude calculating unit may calculate a first attitude of the HMD based on an angular rate detected by an angular rate sensor. The attitude correcting unit may correct the first attitude to calculate a second attitude, based on an acceleration detected by an accelerometer and a rotation amount per predetermined time of the HMD. The image generating unit may generate an image according to the second attitude. The display control unit may cause a display to display the image.

9 Claims, 4 Drawing Sheets

(56) References Cited

U.S. PATENT DOCUMENTS

| | | | |
|---|---|---|---|
| 2011/0307213 A1* | 12/2011 | Zhao | G01C 17/30 |
| | | | 702/153 |
| 2012/0086725 A1* | 4/2012 | Joseph | G06F 3/0346 |
| | | | 345/629 |
| 2014/0267006 A1* | 9/2014 | Raffa | G06F 1/1626 |
| | | | 345/156 |
| 2015/0370324 A1* | 12/2015 | Sullivan | G09G 5/00 |
| | | | 345/156 |
| 2017/0036111 A1 | 2/2017 | Shigeta et al. | |
| 2018/0008141 A1* | 1/2018 | Krueger | A61B 5/744 |
| 2018/0115716 A1* | 4/2018 | Gubler | H04N 5/23287 |

* cited by examiner

US 10,559,064 B2

STORAGE MEDIUM, INFORMATION-PROCESSING DEVICE, INFORMATION-PROCESSING SYSTEM, AND INFORMATION-PROCESSING METHOD

CROSS REFERENCE TO RELATED APPLICATIONS

The disclosure of Japanese Patent Application No. 2018-118670, filed on Jun. 22, 2018, is incorporated herein by reference.

FIELD

An exemplary embodiment relates to a technique for calculating an attitude of a display device.

BACKGROUND AND SUMMARY

Known in the art is a technique for calculating an attitude of a device by use of an angular rate sensor and an accelerometer.

A program according to an exemplary embodiment, which is executed by a display device comprising an angular rate sensor and an accelerometer, causes the display device to execute a process, the process comprising: calculating a first attitude of the display device based on an angular rate detected by the angular rate sensor; correcting the first attitude to calculate a second attitude, based on an acceleration detected by the accelerometer and a rotation amount per predetermined time of the display device; generating an image according to the second attitude; and causing the display device to display the image.

DETAILED DESCRIPTION OF NON-LIMITING EXAMPLE EMBODIMENTS

1. Embodiment

Figure 1:
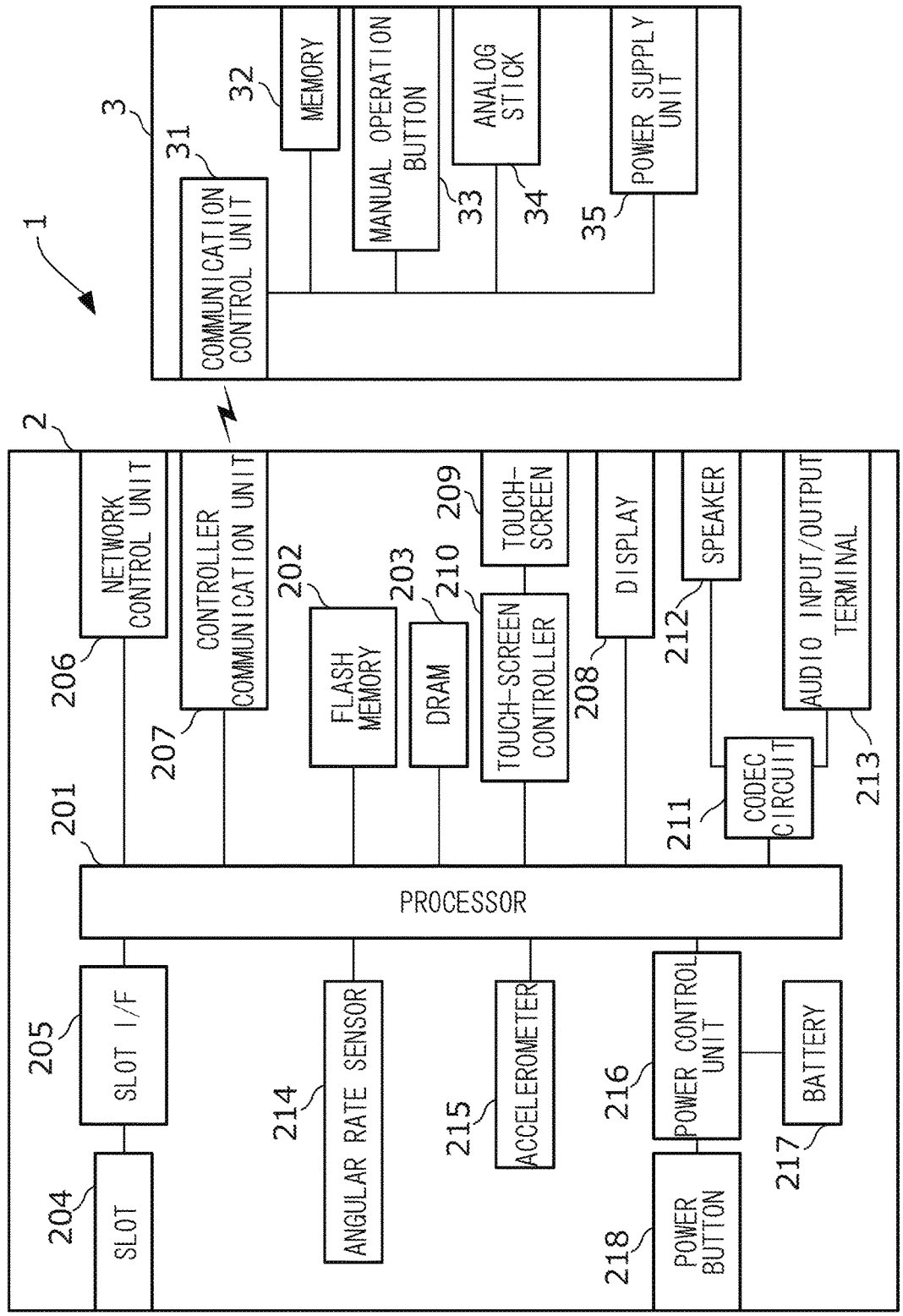
FIG. 1 is a diagram showing an example of an internal configuration of game system 1.

Game system 1 according to an exemplary embodiment will be described. FIG. 1 is a diagram showing an example of an internal configuration of game system 1. As shown in the drawing, game system 1 includes head-mounted display 2, which will hereinafter be referred to as "HMD 2," and controller 3.

1-1. Configuration of HMD 2

Figure 2:
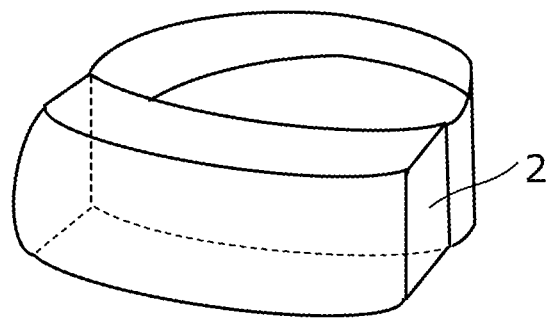
FIG. 2 is a diagram showing an example of an appearance of HMD 2.

FIG. 2 is a diagram showing an example of an appearance of HMD 2. HMD 2 shown in the drawing is a goggle-type HMD; however, HMD 2 may be a helmet-type HMD or an eyeglass-type HMD.

HMD 2, as shown in FIG. 1, includes processor 201 that is an information-processing unit for carrying out various types of information processing. Processor 201 may include only a CPU, or it may include a System-on-a-chip (SoC) having plural functions such as a CPU function or a GPU function. Processor 201 may execute a program stored in an internal storage medium or an external storage medium inserted into slot 204, thereby carrying out various types of information processing.

HMD 2 also includes flash memory 202 and DRAM 203 as an example of an internal storage medium. Flash memory 202 is a non-volatile memory for storing various types of data, and DRAM 203 is a volatile memory for temporarily storing various types of data.

HMD 2 also includes slot 204 and slot interface 205. Slot 204 is shaped such that an external storage medium such as a memory card may be inserted into, and slot interface 205 may read and write data to, an external storage medium inserted into slot 204 in accordance with instructions from processor 201.

HMD 2 also includes network communication unit 206 that may wirelessly communicate with an external device using a wireless LAN or infrared communication.

HMD 2 also includes controller communication unit 207 that may wirelessly communicate with controller 3 using a near field communication technique such as Bluetooth (registered trademark).

HMD 2 also includes display 208 that is a display device such as a liquid crystal display or an organic EL display. Display 208 may display a left-eye image and a right-eye image side by side so that a user is enabled to view a 3D image (or VR image). Display 208, when a user uses HMD 2, is held in front of a user's eyes. Display 208 is held such that if the user moves his/her neck, the display is always positioned in front of the user's eyes.

HMD 2 also includes touch-screen 209 and touch-screen controller 210. Touch-screen 209 is, for example, a capacitive touch screen, which is layered on top of display 208, and touch-screen controller 210 is a circuit for controlling touch-screen 209. Touch-screen controller 210 may generate data indicative of a touched position based on a signal output from touch-screen 209, and output the data to processor 201.

HMD 2 also includes codec circuit 211, speaker 212, and audio input/output terminal 213. Codec circuit 211 is a circuit for controlling input and output of audio data to speaker 212 and audio input/output terminal 213.

HMD 2 also includes angular rate sensor 214 and accelerometer 215. Angular rate sensor 214 may measure, at regular intervals, an angular rate for each of three axes of a 3D Cartesian coordinate system (or local coordinate system) that is defined around the sensor. Data indicative of the measured angular rates is stored in DRAM 203. DRAM 203 stores only the most recent angular rate data. On the other hand, accelerometer 215 may measure, at regular intervals, acceleration for each of three axes of a 3D Cartesian coordinate system (or local coordinate system) that is defined around the sensor. Data indicative of the measured accelerations is stored in DRAM 203. DRAM 203 stores only the most recent acceleration data.

HMD 2 also includes power control unit 216, battery 217, and power button 218. Power control unit 216 may control supply of power from battery 217 to components of HMD 2 under control of processor 201.

1-2. Configuration of Controller 3

Controller 3, as shown in FIG. 1, includes communication controller 31 that includes a microprocessor and may control wireless communication with HMD 2.

Controller 3 also includes memory 32 such as a flash memory. Communication controller 31 may execute firmware stored in memory 32 to carry out various types of processing.

Controller 3 also includes various manual operation buttons 33 and analog stick 34, each of which may output manual operation data to communication controller 31. Communication controller 31 may send obtained manual operation data to HMD 2.

Controller 3 also includes power supply unit 35 that includes a battery and a power control circuit.

1-3. Outline of Operation of Game System 1

Now, an operation of game system 1 will be described.

When an external storage medium storing a game program is inserted into slot 204, and an instruction to start a game is received by a user, HMD 2 executes the game program. In the following description, a situation is assumed in which a first-person action game enabling a player to operate a character within a 3D virtual space is played. It is to be noted that an action game is merely an example of a playable game; and a game of another type may be played.

Figure 3:
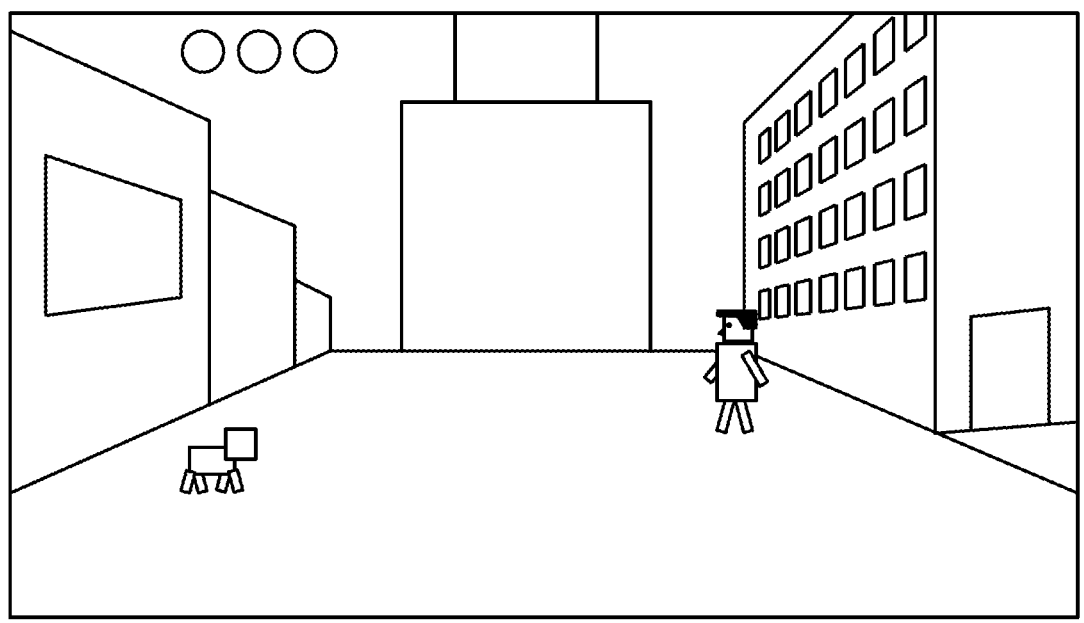
FIG. 3 is a diagram showing an example of an image that may be shown on display 208 during game play.

FIG. 3 is a diagram showing an example of an image that may be shown on display 208 during game play. As shown in the drawing, a 3D virtual space is defined after start of the game, within which a virtual camera is disposed, and images generated using the virtual camera are shown on display 208. A shooting direction of the virtual camera changes according to a direction of vision of the character operated by the player. A position of the virtual camera may be changed by the user by use of controller 3, and an attitude of the virtual camera changes according to an attitude of HMD 2.

Figure 4:
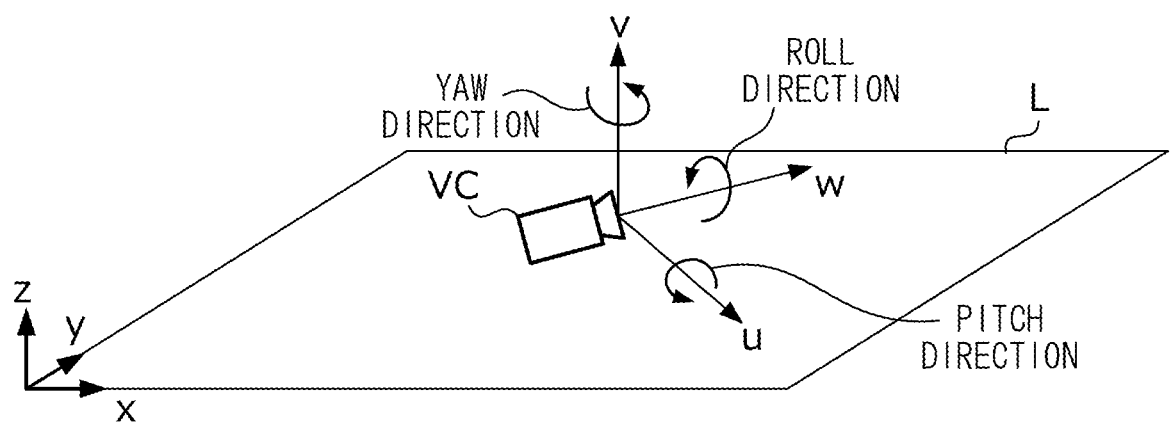
FIG. 4 is a diagram illustrating control of an attitude of virtual camera VC.

FIG. 4 is a diagram illustrating control of an attitude of the virtual camera. As shown in the drawing, within the virtual space, an xyz Cartesian coordinate system (or spatial coordinate system) with a predetermined position within the space as the origin is defined. The z-axis of the spatial coordinate system is an axis extending in the vertical direction of the virtual space, the x-axis is an axis perpendicular to the z-axis, and the y-axis is an axis perpendicular to the z-axis and the x-axis. On the x-y plane, ground surface object L is disposed, on which virtual camera VC is disposed. For virtual camera VC, as shown in the drawing, a uvw Cartesian coordinate system (or viewing coordinate system) with the camera as the origin is defined. The u-axis of the viewing coordinate system is an axis extending in the horizontal direction relative to virtual camera VC, the v-axis is an axis extending in the vertical direction relative to virtual camera VC, and the w-axis is an axis extending in the front-back direction relative to virtual camera VC. Virtual camera VC may rotate around the u-axis (in a pitch direction), the v-axis (in a yaw direction), and the w-axis (in a roll direction). Below, a processing for generating and displaying an image by use of virtual camera VC will be described.

1-4. Image Display Processing

Figure 5:
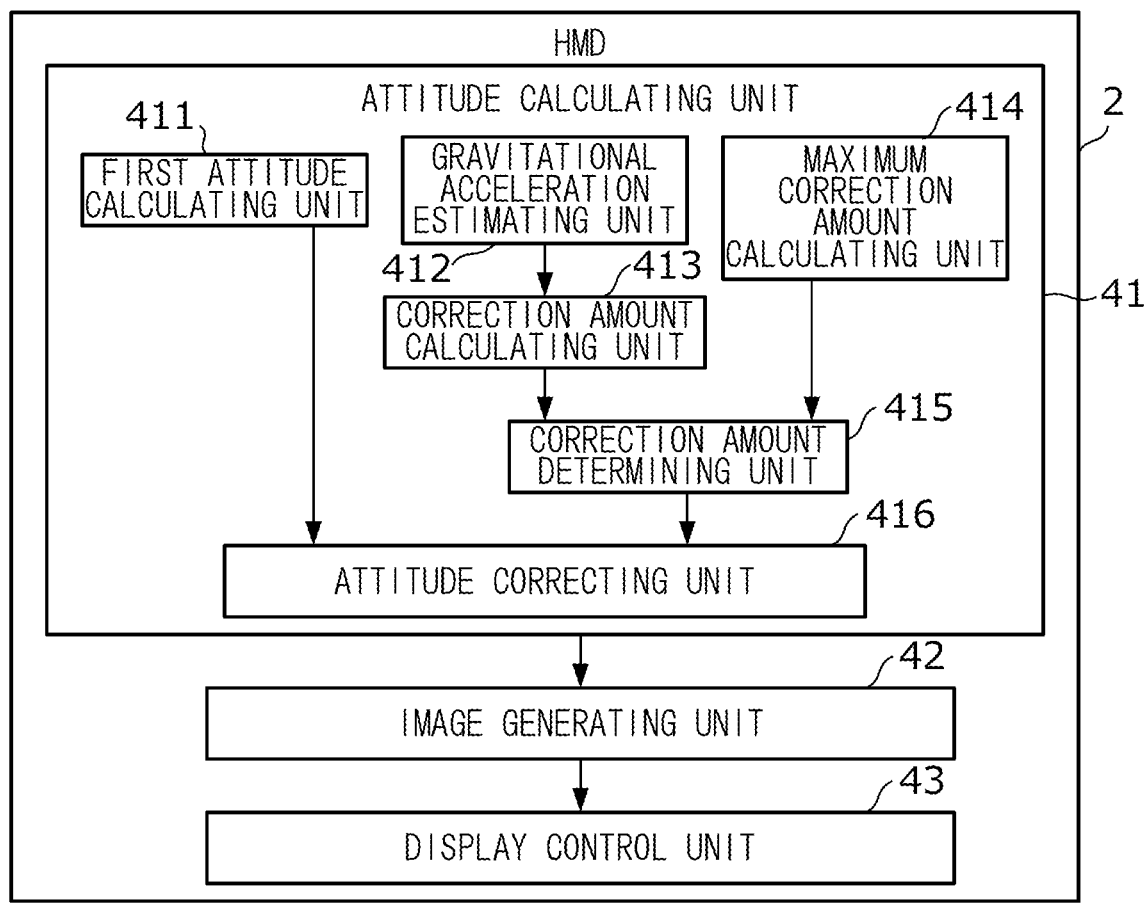
FIG. 5 is a block diagram showing an example of a functional configuration for carrying out an image display processing.
Figure 6:
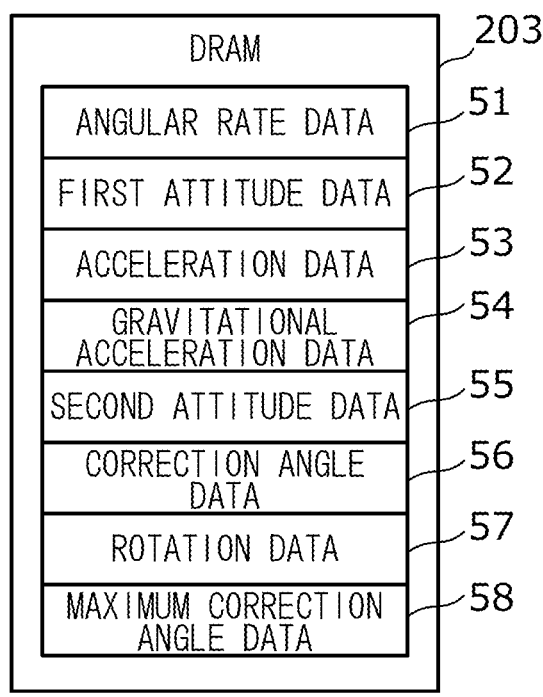
FIG. 6 is a diagram showing an example of data used for the image display processing.

FIG. 5 is a block diagram showing an example of a functional configuration for carrying out an image display processing. FIG. 6 is a diagram showing an example of data used for the image display processing. Attitude calculating unit 41, image generating unit 42, and display control unit 43 shown in FIG. 5 are provided by execution of a game program by processor 201. The game program is a program that can be distributed via a network such as the Internet or a non-transitory storage medium.

Attitude calculating unit 41 calculates an attitude of HMD 2 based on an angular rate measured by angular rate sensor 214 and an acceleration measured by accelerometer 215. Specifically, attitude calculating unit 41 calculates a first attitude of HMD 2 based on an angular rate measured by angular rate sensor 214, and corrects the first attitude based on an acceleration measured by accelerometer 215 to calculate a second attitude of HMD 2. When performing this process, attitude calculating unit 41 calculates a maximum correction angle from an angular rate, and makes the correction based on the maximum correction angle as an upper limit. Details of the processing will be described later. It is of note that the reason that the first attitude calculated based on an angular rate is corrected is that errors in an attitude measured based on an angular rate accumulate over time. To correct the errors, the first attitude is corrected based on an acceleration.

Image generating unit 42 generates an image according to an attitude of HMD 2 calculated by attitude calculating unit 41, which image is generated by capturing an image of the virtual space by use of the virtual camera whose attitude corresponds to that of HMD 2.

Display control unit 43 causes display 208 to display an image generated by image generating unit 42.

Now, a processing carried out by attitude calculating unit 41 will be described in detail.

Attitude calculating unit 41, as shown in FIG. 5, includes first attitude calculating unit 411, gravitational acceleration estimating unit 412, correction amount calculating unit 413, maximum correction amount calculating unit 414, correction amount determining unit 415, and attitude correcting unit 416.

First attitude calculating unit 411 calculates a first attitude based on an angular rate measured by angular rate sensor 214. Specifically, first attitude calculating unit 411 integrates an angular rate obtained in a most recent processing loop of the image display processing, and adds an angle obtained by the integration to a first attitude calculated in a previous processing loop, to calculate a new first attitude. The angular rate obtained in a most recent processing loop refers to an angular rate represented by angular rate data 51 stored in DRAM 203. The first attitude calculated in a previous processing loop refers to a first attitude represented by first attitude data 52 stored in DRAM 203. After calculating the new first attitude, first attitude calculating unit 411 updates first attitude data 52 stored in DRAM 203 with data indicative of the new first attitude.

Gravitational acceleration estimating unit 412 estimates a gravitational acceleration acting on HMD 2. Specifically, gravitational acceleration estimating unit 412 converts an acceleration expressed using a local coordinate system, obtained in a most recent processing loop of the image display processing into an acceleration expressed using a global coordinate system. The global coordinate system refers to a 3D Cartesian coordinate system that is defined within the real space with a predetermined position in the space as the origin. After obtaining the acceleration expressed using the global coordinate system, gravitational acceleration estimating unit 412 calculates a difference between the obtained acceleration and a gravitational acceleration calculated in a previous processing loop, multiplies the difference by a smoothing parameter, and adds a value obtained by the multiplication to the same gravitational acceleration. More specifically, gravitational acceleration estimating unit 412 calculates a gravitational acceleration using the following equations (1) and (2).

$$Acc^{global} = R^{global} Acc \quad (1)$$

$$G_t = G_{t-1} + \alpha(Acc^{global} - G_{t-1}) \quad (2)$$

In equation (1), parameter $Acc^{global}$ refers to an acceleration expressed using the global coordinate system, constant $R^{global}$ refers to a rotation matrix used to convert an acceleration expressed using the local coordinate system into an acceleration expressed using the global coordinate system, and parameter Acc refers to an acceleration expressed using the local coordinate system, obtained in a most recent processing loop. The acceleration expressed using the local coordinate system, obtained in a most recent processing loop, refers to an acceleration represented by acceleration data 53 stored in DRAM 203. In equation (2), parameter $G_t$ refers to a gravitational acceleration calculated in a most recent processing loop, parameter $G_{t-1}$ refers to a gravitational acceleration calculated in a previous processing loop, and parameter $\alpha$ refers to a smoothing parameter. The gravitational acceleration calculated in a previous processing loop refers to a gravitational acceleration represented by gravitational acceleration data 54 stored in DRAM 203. Gravitational acceleration estimating unit 412, after calculating the gravitational acceleration, updates gravitational acceleration data 54 stored in DRAM 203 with data indicative of the gravitational acceleration.

It is of note that the smoothing parameter is a parameter that changes according to a stillness of HMD 2. The smoothing parameter can be obtained by calculating a magnitude of an acceleration measured by accelerometer 215, which acceleration is represented by acceleration data 53 stored in DRAM 203. A value of the smoothing parameter is higher as a magnitude of an acceleration is closer to magnitude "1 (G)" of a gravitational acceleration (in other words, as HMD 2 is closer to a static condition). This is because an acceleration whose magnitude is closer to magnitude "1 (G)" of a gravitational acceleration is considered to be reliable as a value indicative of a direction of gravitational force.

It is to be noted that, as a modified example, the smoothing parameter may be obtained by calculating not a magnitude of an instantaneous value of an acceleration, but a magnitude of an average acceleration per second. As another modified example, the smoothing parameter may be calculated based on not only a value of acceleration but also a value of angular rate. The value of angular rate, specifically, refers to a magnitude, variance, or amount of change of an angular rate.

Correction amount calculating unit 413 calculates a correction angle to be applied to a first attitude calculated by first attitude calculating unit 411, based on a gravitational acceleration estimated by gravitational acceleration estimating unit 412. The correction angle is used to bring a direction of a downward-direction vector for HMD 2 being in a first attitude, the direction being expressed using the global coordinate system, closer to a direction of a gravitational acceleration estimated by gravitational acceleration estimating unit 412. To obtain a correction angle, correction amount calculating unit 413 takes a cross product of a direction of a downward-direction vector for HMD 2 being in a second attitude, the direction being expressed using the global coordinate system, and a direction of a gravitational acceleration estimated by gravitational acceleration estimating unit 412, and calculates a correction angle at which a first attitude is rotated around the obtained cross product (or vector). The second attitude of HMD 2 refers to a second attitude calculated by attitude correcting unit 416 in a previous processing loop of the image display processing, which attitude is represented by second attitude data 55 stored in DRAM 203. Correction amount calculating unit 413, more specifically, calculates a correction angle using the following equations (3), (4), and (5).

$$rot = G_t \times Z \quad (3)$$

$$axix_v = rot/|rot| \quad (4)$$

$$\theta_v = a\sin(|rot|) \quad (5)$$

In equation (3), parameter $G_t$ refers to a gravitational acceleration calculated in a most recent processing loop, and parameter Z refers to a direction of a downward-direction vector for HMD 2 being in a second attitude, the direction being expressed using the global coordinate system. The gravitational acceleration calculated in a most recent processing loop refers to a gravitational acceleration represented by gravitational acceleration data 54 stored in DRAM 203. On the other hand, parameter Z refers to a vector of the z-axis direction represented by second attitude data 55 stored in DRAM 203. In equation (5), parameter $\theta_v$ refers to a correction angle. Correction amount calculating unit 413, after calculating the correction angle, updates correction angle data 56 stored in DRAM 203 with data indicative of the correction angle, and also updates rotation data 57 stored in DRAM 203 with data indicative of parameter rotation.

Maximum correction amount calculating unit 414 calculates a rotation amount per predetermined time of HMD 2 based on an angular rate measured by angular rate sensor 214, and calculates a maximum correction angle based on the calculated rotation amount, that is an upper limit of correction angle to be applied to a first attitude calculated by first attitude calculating unit 411. The maximum correction angle changes according to an angular rate; specifically, the maximum correction angle increases as an angular rate increases. This is because when an angular rate is large (in other words, when HMD 2 moves significantly), an image shown on flash memory 202 also changes significantly according to the angular rate; accordingly, a user is unlikely to feel discomfort even if the correction is large. In contrast, when an angular rate is small (in other words, when HMD 2 is close to a static condition), a user may feel discomfort if the correction is large. Especially, when a user uses a device whose display is close to the user's eyes, such as an HMD, the user may feel significant discomfort. Maximum correction amount calculating unit 414, specifically, calculates a correction angle using the following equation (6).

$$\theta_v^{max} = (k_0 + k_1 \|\Omega_t\| dt) * strength_v \quad (6)$$

In equation (6), parameter $\theta_v^{max}$ refers to a maximum correction angle, constant $k_0$ refers to a minimum correction value, constant $k_1$ refers to a correction coefficient, parameter $\Omega_t$ refers to an angular rate expressed using the local coordinate system, obtained in a most recent processing pool of the image display processing, parameter dt refers to a sampling period for measurement of an angular rate, and constant $strength_v$ refers to a correction coefficient. Constant $k_0$ refers to a minimum correction value required to correct errors in a first attitude that accumulates even when HMD 2 remains still, which constant may be freely selected. Constants $k_1$ and $strength_v$ refer to a correction coefficient that may be freely selected by an application developer depending on a type or running state (for example, a scene of a game being played) of an application. Parameter $\Omega_t$, specifically, refers to an angular rate represented by angular rate data 51 stored in DRAM 203. Maximum correction amount calculating unit 414, after calculating the maximum correction angle, updates maximum correction angle data 58 stored in DRAM 203 with data indicative of the maximum correction angle.

Correction amount determining unit 415 compares a correction angle calculated by correction amount calculating unit 413 and a maximum correction angle calculated by maximum correction amount calculating unit 414 to determine a correction angle to be applied to a first attitude calculated by first attitude calculating unit 411. As a result of the comparison, when the former angle is equal to or smaller than the latter angle, correction amount determining unit 415 determines the former angle as a correction angle; on the other hand, when the former angle is larger than the latter angle, correction amount determining unit 415 determines the latter angle as a correction angle. The correction angle calculated by correction amount calculating unit 413 refers to a correction angle represented by correction angle data 56 stored in DRAM 203, and the maximum correction angle calculated by maximum correction amount calculating unit 414 refers to a maximum correction angle represented by maximum correction angle data 58 stored in DRAM 203.

Attitude correcting unit 416 corrects a first attitude calculated by first attitude calculating unit 411 based on a correction angle determined by correction amount determining unit 415 to calculate a second attitude. Specifically, attitude correcting unit 416 rotates a first attitude calculated by first attitude calculating unit 411 around a vector calculated by correction amount calculating unit 413 by a correction angle determined by correction amount determining unit 415 to calculate a second attitude. The first attitude calculated by first attitude calculating unit 411 refers to a first attitude represented by first attitude data 52 stored in DRAM 203, and the vector calculated by correction amount calculating unit 413 refers to a vector represented by rotation data 57 stored in DRAM 203. A second attitude may be calculated using the Rodrigues' rotation formula, for example. After calculating the second attitude, attitude correcting unit 416 updates second attitude data 55 stored in DRAM 203 with data indicative of the second attitude.

Figure 7:
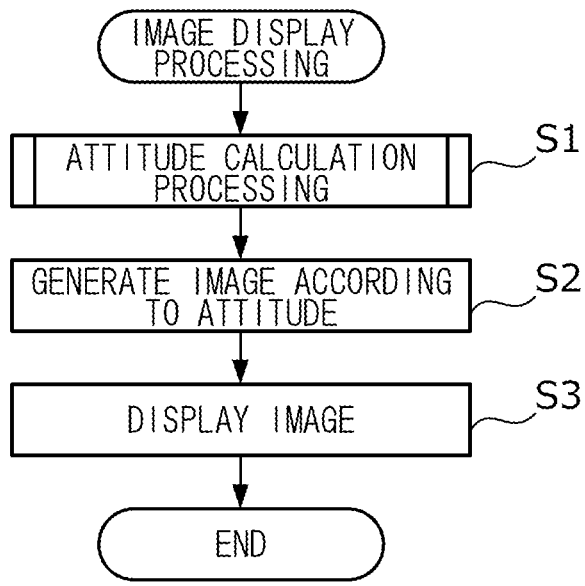
FIG. 7 is a flowchart showing an example of the image display processing.

Now, a procedure of the image display processing will be described. FIG. 7 is a flowchart showing an example of the image display processing. The image display processing shown in the drawing is repeatedly carried out at regular intervals during game play.

At step S1 of the image display processing, attitude calculating unit 41 calculates an attitude of HMD 2 based on an angular rate measured by angular rate sensor 214 and an acceleration measured by accelerometer 215. Specifically, attitude calculating unit 41 calculates a first attitude of HMD 2 based on an angular rate measured by angular rate sensor 214, and corrects the first attitude based on an acceleration measured by accelerometer 215 to calculate a second attitude of HMD 2. When performing this process, attitude calculating unit 41 calculates a maximum correction angle from an angular rate, and makes the correction based on the maximum correction angle as an upper limit. Below, the processing will be specifically described with reference to FIG. 8.

Figure 8:
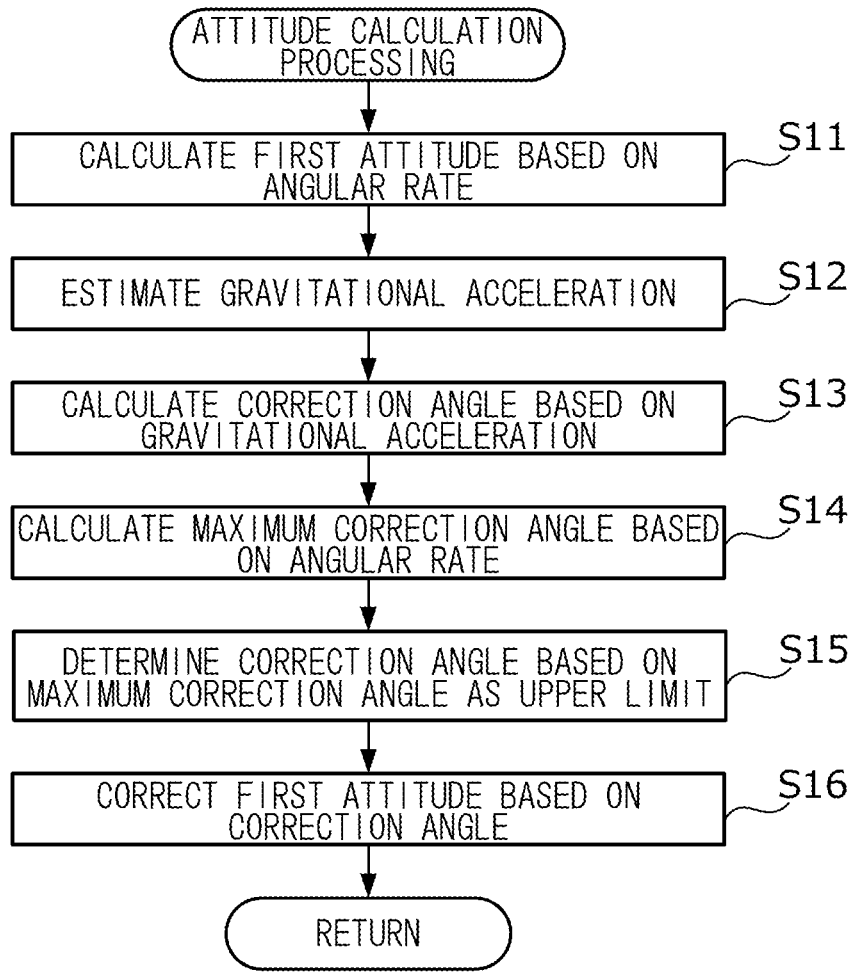
FIG. 8 is a flowchart showing an example of an attitude calculation processing.

FIG. 8 is a flowchart showing an example of an attribute calculation processing. At step S11 of the attitude calculation processing, first attitude calculating unit 411 calculates a first attitude based on an angular rate measured by angular rate sensor 214. Specifically, first attitude calculating unit 411 integrates an angular rate represented by angular rate data 51 stored in DRAM 203, and adds an angle obtained by the integration to a first attitude represented by first attitude data 52 stored in DRAM 203, to calculate a new first attitude. After calculating the new first attitude, first attitude calculating unit 411 updates first attitude data 52 stored in DRAM 203 with data indicative of the new first attitude.

Subsequently, at step S12, gravitational acceleration estimating unit 412 estimates a gravitational acceleration acting on HMD 2. Specifically, gravitational acceleration estimating unit 412 converts an acceleration expressed using a local coordinate system, represented by acceleration data 53 stored in DRAM 203, into an acceleration expressed using a global coordinate system. After obtaining the acceleration expressed using the global coordinate system, gravitational acceleration estimating unit 412 calculates a difference between the obtained acceleration and a gravitational acceleration represented by gravitational acceleration data 54 stored in DRAM 203, multiplies the difference by a smoothing parameter, and adds a value obtained by the multiplication to the same gravitational acceleration. More specifically, gravitational acceleration estimating unit 412 calculates a gravitational acceleration using the above equations (1) and (2). After calculating the gravitational acceleration, gravitational acceleration estimating unit 412 updates gravitational acceleration data 54 stored in DRAM 203 with data indicative of the gravitational acceleration.

Subsequently, at step S13, correction amount calculating unit 413 calculates a correction angle to be applied to the first attitude calculated at step S11, based on the gravitational acceleration estimated at step S12. Specifically, correction amount calculating unit 413 takes a cross product of a direction of a downward-direction vector for HMD 2 being in a second attitude, the direction being expressed using the global coordinate system, and a direction of the gravitational acceleration estimated by gravitational acceleration estimating unit 412, and calculates a correction angle at which the first attitude is rotated around the obtained cross product (or vector). The second attitude of HMD 2 refers to a second attitude represented by second attitude data 55 stored in DRAM 203. Correction amount calculating unit 413, more specifically, calculates a correction angle using the above equations (3), (4), and (5). After calculating the correction angle, correction amount calculating unit 413 updates correction angle data 56 stored in DRAM 203 with data indicative of the correction angle, and also updates rotation data 57 stored in DRAM 203 with data indicative of parameter rotation.

Subsequently, at step S14, maximum correction amount calculating unit 414 calculates a maximum correction angle that is an upper limit of a correction angle to be applied to a first attitude calculated at step S11, based on the angular rate represented by angular rate data 51 stored in DRAM 203. Specifically, maximum correction amount calculating unit 414 calculates a correction angle using above equation (6). After calculating the maximum correction angle, maximum correction amount calculating unit 414 updates maximum correction angle data 58 stored in DRAM 203 with data indicative of the maximum correction angle.

Subsequently, at step S15, correction amount determining unit 415 compares the correction angle calculated at step S13 and the maximum correction angle calculated at step S14 to determine a correction angle to be applied to the first attitude calculated at step S11. As a result of the comparison, when the former angle is equal to or smaller than the latter angle, correction amount determining unit 415 determines the former angle as a correction angle; on the other hand, when the former angle is larger than the latter angle, correction amount determining unit 415 determines the latter angle as a correction angle.

Subsequently, at step S16, attitude correcting unit 416 corrects the first attitude calculated at step S11 based on the correction angle determined at step S15 to calculate a second attitude. Specifically, attitude correcting unit 416 rotates the first attitude calculated at step S11 around the vector calculated at step S13 by the correction angle determined at step S15 to calculate a second attitude. A second attitude may be calculated using the Rodrigues' rotation formula, for example. After calculating the second attitude, attitude correcting unit 416 updates second attitude data 55 stored in DRAM 203 with data indicative of the second attitude.

The foregoing is a description of the attitude calculation processing.

After the attitude of HMD 2 is calculated as a result of the attitude calculation processing, at step S2 shown in FIG. 7, image generating unit 42 generates an image according to the calculated attitude of HMD 2, which image is generated by capturing an image of the virtual space by use of the virtual camera whose attitude corresponds to that of HMD 2.

Subsequently, at step S3, display control unit 43 causes display 208 to display the image generated at step S2.

The foregoing is a description of the image display processing.

HMD 2 described in the foregoing calculates a first attitude of HMD 2 based on an angular rate measured by angular rate sensor 214, and corrects the first attitude based on an acceleration measured by accelerometer 215. When performing this process, HMD 2 calculates a maximum correction angle based on an angular rate, and makes the correction based on the maximum correction angle as an upper limit. The maximum correction angle increases as an angular rate increases; accordingly, a correction to be applied to the first attitude increases as an angular rate increases. In a case where an angular rate is small (in other words, when HMD 2 is close to a static condition), a substantial correction to a first attitude gives a user a feeling of discomfort. For example, when a screen transmits unsmoothly, or a screen rotates in the roll direction when HMD 2 remains still, a user's head may be caused to move around. In contrast, in a case where an angular rate is large (in other words, when HMD 2 moves significantly), a substantial correction to a first attitude is unlikely to give a user a feeling of discomfort because the correction is hidden in a change of an image caused by the movement of HMD 2.

2. Modifications

The above embodiment may be modified as described below. Two or more of the following modifications may be combined with each other.

2-1. Modification 1

HMD 2 may not be a type of device that is affixed to a user's head using a band, but may be a type of device that is held by a user's hands in front of his/her eyes. For example, HMD 2 may be a box-shaped cardboard viewer (image display device) that is used with a smart phone inserted thereinto.

2-2. Modification 2

A VR application executed by HMD 2 is not limited to a game, and may be a VR application in an educational or medical field, for example.

2-3. Modification 3

HMD 2 measures a rotation amount per predetermined time by use of angular rate sensor 214; however, a method for measuring a rotation amount is not limited to this. For example, HMD 2 may be provided with infrared LEDs and infrared sensors may be installed around HMD 2 so that a rotation amount of HMD 2 may be measured based on detection of infrared rays by the respective infrared sensors. Alternatively, HMD 2 may be provided with an optical camera so that a rotation amount of HMD 2 may be measured based on images captured by the optical camera.

2-4. Modification 4

HMD 2 may have a function of correcting a first attitude based on an acceleration measured by accelerometer 215, without considering a maximum correction angle (in other words, an angular rate measured by angular rate sensor 214). Specifically, HMD 2 may have a function of correcting a first attitude calculated by first attitude calculating unit 411 by rotating the first attitude around a vector calculated by correction amount calculating unit 413 by a correction angle calculated by correction amount calculating unit 413. The function will hereinafter be referred to as "second attitude correcting unit." In addition, HMD 2 may select either attitude correcting unit 416 or the second attitude correcting unit based on a user's operation of controller 3. In such a case, when attitude correcting unit 416 is selected, image generating unit 42 generates an image according to an attitude calculated by attitude correcting unit 416, and when the second attitude correcting unit is selected, image generating unit 42 generates an image according to an attitude calculated by the second attitude correcting unit. HMD 2, instead of making the selection based on a user's operation, may automatically make the selection according to a type or running state of an application (for example, a scene in a game being played).

2-5. Modification 5

The image display processing executed by HMD 2 may be executed by an image processing system including networked information-processing devices.

2-6. Modification 6

The attribute calculation processing shown in FIG. 8 may be used to estimate an attitude of an autonomous driving robot.

What is claimed is:

1. A non-transitory storage medium storing a program to be executed by a display device comprising an angular rate sensor and an accelerometer, the program causing the display device to execute a process, the process comprising:
    calculating a first attitude of the display device based on an angular rate detected by the angular rate sensor;
    correcting the first attitude to calculate a second attitude, based on a first correction amount, an acceleration detected by the accelerometer, and a rotation amount per predetermined time of the display device;

as part of correcting the first attitude to calculate the second attitude:
    determining the first correction amount based on the acceleration detected by the accelerometer and the rotation amount, wherein when a second correction amount is equal to or smaller than a third correction amount, determining the second correction amount as the first correction amount, wherein when the second correction amount is larger than the third correction amount, determining the third correction amount as the first correction amount,
    calculating the second correction amount based on the acceleration detected by the accelerometer, and
    calculating the third correction amount based on the rotation amount, the third correction amount being an upper limit of the first correction amount;
generating an image according to the second attitude; and
causing the display device to display the image.

2. The non-transitory storage medium according to claim 1, wherein:
the process further comprises:
    correcting the first attitude to calculate a third attitude, based on the acceleration detected by the accelerometer, without being based on the rotation amount; and
    selecting the second attitude or the third attitude,
the step of generating the image comprises:
    when the second attitude is selected, generating an image according to the second attitude; and
    when the third attitude is selected, generating an image according to the third attitude.

3. The non-transitory storage medium according to claim 1, wherein the step of correcting the first attitude comprises calculating the rotation amount based on the angular rate detected by the angular rate sensor.

4. The non-transitory storage medium according to claim 3, wherein the
    first correction amount is larger in proportion to an increase in the angular rate detected by the angular rate sensor.

5. The non-transitory storage medium according to claim 4, wherein calculation of the third correction amount further comprises adding a value to the rotation amount to calculate the third correction amount.

6. The non-transitory storage medium according to claim 4, wherein:
    the process further comprises executing an application; and
    wherein calculation of the third correction amount further comprises multiplying the rotation amount by a coefficient according to a type or running state of the application to calculate the third correction amount.

7. An information-processing device comprising:
an angular rate sensor;
an accelerometer;
a display adapted to be held in front of eyes of a user of the information-processing device; and
at least one hardware processor configured to:
    calculate a first attitude of the information-processing device based on an angular rate detected by the angular rate sensor;
    calculate a second correction amount based on acceleration detected by the accelerometer;
    calculate a third correction amount based on a rotation amount per predetermined time of the information-processing device;
    compare the second correction amount to the third correction amount and, based on that comparison, determine the second correction amount as a first correction amount or, alternatively, determine third correction amount as the first correction amount, wherein the third correction amount is an upper limit of the first correction amount;
    calculate a second attitude based on correction of the first attitude by using the first correction amount, the acceleration detected by the accelerometer and the rotation amount;
    generate an image according to the second attitude; and
    cause the display to display the image.

8. An information-processing system comprising:
an angular rate sensor;
an accelerometer;
a display; and
at least one processor configured to:
    calculate a first attitude of the information-processing system based on an angular rate detected by the angular rate sensor;
    calculate a second correction amount based on acceleration detected by the accelerometer;
    calculate a third correction amount based on a rotation amount per predetermined time;
    compare the second correction amount to the third correction amount and, based on that comparison, determine the second correction amount as a first correction amount or, alternatively, determine third correction amount as the first correction amount, wherein the third correction amount is an upper limit of the first correction amount;
    correct the first attitude to calculate a second attitude by using the first correction amount, the acceleration detected by the accelerometer, and the rotation amount;
    generate an image according to the second attitude; and
    cause the display to display the image.

9. An information-processing method to be executed by an information-processing system comprising an angular rate sensor, an accelerometer, and a display, the method comprising:
    calculating a first attitude of the information-processing system based on an angular rate detected by the angular rate sensor;
    correcting the first attitude to calculate a second attitude, based on an acceleration detected by the accelerometer and a rotation amount per predetermined time of the information-processing system;
    as part of correcting the first attitude to calculate the second attitude:
        calculating a second correction amount based on the acceleration detected by the accelerometer,
        calculating a third correction amount based on the rotation amount, and
        determining a first correction amount based on the acceleration detected by the accelerometer and the rotation amount, wherein the third correction is an upper limit of the first correction amount, wherein when the second correction amount is equal to or smaller than the third correction amount, the second correction amount is determined as the first correction amount, wherein when the second correction amount is larger than the third correction amount, the third correction amount is determined as the first correction amount;
    generating an image according to the second attitude; and
    causing the display to display the image.

* * * * *